Patented Feb. 16, 1932

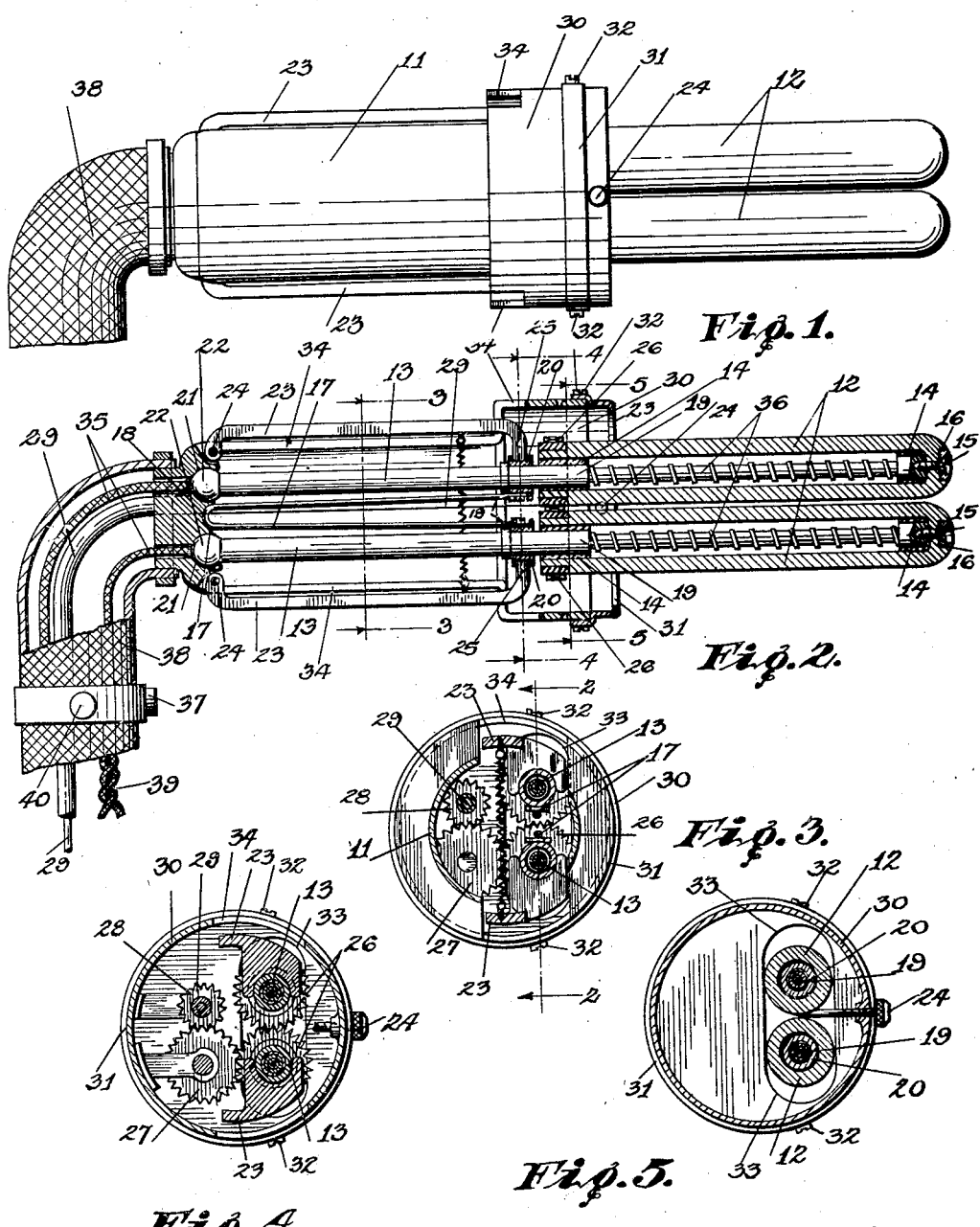

1,845,208

UNITED STATES PATENT OFFICE

SACRAMENTA G. TANKINS, OF ATLANTIC CITY, NEW JERSEY

METHOD OF AND MEANS FOR TREATING HUMAN HAIR

Application filed July 14, 1931. Serial No. 550,764.

The invention relates to straightening hair, particularly hair having a wavy or kinky characteristic appearance due to its natural growth, and comprises both a method of procedure and an improved appliance.

The improved method involves the simultaneous application of both pressure and moderate heat to a number of strands, working along the strands from root to tip without subjecting them to more than moderate tension, as by rolling between heated rollers which are caused to rotate slowly to move them along the strands.

Objects of the invention are to provide convenient means for applying to the hair heat and pressure in adjustable amounts at different speeds, as desired, and to save time and labor.

In the accompanying drawings, wherein I have shown one embodiment of my invention for purposes of illustration, Fig. 1 is a side view;

Fig. 2 is a lengthwise sectional view taken on the line 2—2 in Fig. 3, and

Figs. 3, 4, and 5 are sectional views taken transversely on the lines 3—3, 4—4, and 5—5, respectively, in Fig. 2.

The device may be constructed in suitable form for ready manipulation by hand, the electric current for heating being conducted from a suitable service outlet by a flexible cord, and the power for rotating the rolls being furnished through a flexible shaft from a small electric motor mounted in a convenient place nearby. No detailed description of the sources of heating and rotating energy are thought to be necessary, as they are readily available.

In the preferred embodiment of my invention selected for illustration herein and shown in the drawings, referring particularly to Figs. 1 and 2, the apparatus comprises a casing 11, adapted to be grasped by the hand of the operator, and from one end of which the hair engaging rollers 12 project. These rollers are preferably made in the form of hollow tubes or thimbles, substantially closed at their outer ends and slipped over the ends of the heating elements 13, being rotatably supported thereon by means of insulating bushings 14, and retained in place by screws 15 engaging in threaded holes in the ends of the heating elements. Insulating washers 16 are arranged between the screws and the ends of the rollers.

The heating elements and rollers are normally held apart by means of the spring 17, which is located between the heating elements and is seated in a recess 18 in the inner end of the casing 11, and attached at the outer ends 19 to the insulating bushings 20. At their inner ends the heating elements are pivotally seated in semi-spherical cavities 21 formed in the inner end of the casing by means of the insulating ball-shape thimbles 22, permitting free movement of the outer ends to separate them, as in applying the device to the hair. As shown in Fig. 2, the heating elements are in their position of use to engage the hair.

The position of the heating elements and rollers to engage the hair may be controlled by handles or grips 23, which are pivoted at 24 in the inner end of the casing and attached at their outer ends 25 to the bushings 20 on the heating elements 13. Pressure applied to the grips 23 against the action of the spring 17 will bring the heating elements 13 and the rollers 12 together. The proximity of the rollers 12 is controlled by means of the adjustable screw 24 which has a tapered point that projects between the rollers in order to govern the amount of pressure to be given to the strands of hair. The position of the screw may be readily adjusted by the operator during the operation of the device as desired.

Gears 26 on the inner ends of the rollers cause them to rotate in unison, the rotation being imparted through an idler gear 27 from a gear 28 on the end of a flexible shaft 29 connected to a motor (not shown) located at a suitable place adjacent to the place of use of the device. A housing 30 encloses the gearing that drives the rollers, access to which is permitted by a removable flanged closure 31, fastened by screws 32, which closure also serves to retain the rollers in approximately parallel alinement on the heating elements 13 by means of a slot 33 to allow for the movement of the rollers 12. Opposed slots 34 are also provided in the housing 30 to allow for the movement of the grips 23. This housing prevents strands of hair from getting caught in the gearing.

The heating elements are hollow, forming ducts for the wires 35 that supply electric current to the resistance coils 36 positioned on their outer ends within the rollers 12. Preferably one of the wires 35 is connected to the outer end of one resistance coil 36 and the other wire 35 is connected to the outer end of the other resistance coil 36, the inner ends of said coils being connected to the heating elements and thus secured together by a short wire or other suitable electrical connection, whereby current may be circulated through both resistance coils in series from a switch 37 on the handle end 38 of the device from the flexible cord or power wires 39 which lead to any convenient service outlet box or source of current. A rheostat 40 is conveniently arranged in the circuit for controlling the degree of heat.

The operation of the device is simple, the hair being caught at the scalp between the rollers 13 and allowed to pass between them as they are slowly rotated by the motor driven flexible shaft 29 and gearing. Whatever pressure is desired can be applied to the strands, the effective pressure being regulated by means of the screw 24. Upon reaching the ends of the hair, the pressure may be released and the device removed. It is obvious that the rollers, being driven by an electric motor, will rotate at a constant speed, insuring uniform application of the regulated heat.

Much greater pressure may thus be applied to the hair than by means of any device that has to be pulled along the strands or pressed against the strands; and the degree of heating may be accurately controlled by the rheostat 40 or other current controlling device in the circuit 39.

My invention obviously is not restricted to the particular structural embodiment and procedure herein illustrated and described.

Having disclosed one illustrative embodiment of my invention, what I claim and desire to secure by Letters Patent is:

1. The method of treating hair to straighten it by simultaneously applying regulated heat and pressure directly to the strands progressively from scalp to end thereof as by heated rollers.

2. An appliance for simultaneously applying heat and pressure to the strands of hair comprising a pair of opposed hollow rollers, means for heating said rollers located within them, means for rotating said rollers in unison at a constant speed, and means for adjusting the width of the gap between said rollers.

3. In an appliance for simultaneously applying heat and pressure to the strands of hair, a casing, two parallel electric heating units projecting from said casing, hollow rollers mounted for rotation on the projecting ends of said heating units, means for rotating said rollers at a constant speed, and means for controlling the heating current supplied to said heating units.

4. The method of treating hair to straighten it by simultaneously applying regulated heat and pressure directly to the strands progressively from scalp to end thereof.

5. The method of treating hair to straighten it by simultaneously applying regulated heat and pressure, sequentially and progressively, directly thereto, commencing at the scalp end thereof and progressing toward the end thereof remote from the scalp end.

6. The method of treating hair to straighten it by simultaneously applying moderate tension with regulated heat and pressure directly to the strands progressively from scalp to end thereof.

7. An appliance for simultaneously applying heat and pressure to the strands of hair comprising a pair of opposed hollow rollers, means for heating said rollers located within them, means for rotating said rollers in unison at a constant speed, means for adjusting the width of the gap between said rollers, and means for moving the rollers in relation to each other.

8. In a power operated portable appliance for treating human hair on the head, a casing having a handle, a pair of heating elements pivotally mounted therein, electric conductors extending through said handle to said heating elements, said handle comprising a movable gripping member adapted to press said heating elements together, spring means tending to separate said heating elements, and means for adjusting the relative position of said heating elements when pressed together.

9. In a power operated portable appliance for treating human hair on the head, a casing having a handle, a pair of heating elements pivotally mounted therein, rollers mounted on the outer ends of said heating elements, electric conductors extending through said handle to said heating elements, said handle comprising a movable gripping member adapted to press said heating elements together, spring means tending to separate said heating elements, and means for adjusting the relative position of said heating elements when pressed together.

10. In a power operated portable appliance for treating human hair on the head, a casing having a handle, a pair of heating elements pivotally mounted therein, rollers mounted on the outer ends of said heating elements, electric conductors extending through said handle to said heating elements, said handle comprising a movable gripping member adapted to press said heating elements together, and means for rotating said rollers in unison.

11. In a power operated portable appliance for treating human hair on the head, a casing having a handle, a pair of heating elements pivotally mounted therein, rollers mounted on the outer ends of said heating elements, electric conductors extending through said handle to said heating elements, said handle comprising a movable gripping member adapted to press said heating elements together, and means for rotating said rollers in unison, including power means and a flexible driving shaft extending through said handle to said roller rotating means.

In testimony whereof, I have signed my name to this specification.

SACRAMENTA G. TANKINS.